United States Patent
Komiya

(10) Patent No.: US 11,413,957 B2
(45) Date of Patent: Aug. 16, 2022

(54) GAS SUPPLY SYSTEM AND CONTROL METHOD OF GAS SUPPLY SYSTEM

(71) Applicant: TOYOTA JIDOSHA KABUSHIKI KAISHA, Toyota (JP)

(72) Inventor: Kenji Komiya, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 264 days.

(21) Appl. No.: 16/936,502

(22) Filed: Jul. 23, 2020

(65) Prior Publication Data

US 2021/0094409 A1    Apr. 1, 2021

(30) Foreign Application Priority Data

Sep. 26, 2019  (JP) .............................. JP2019-174984

(51) Int. Cl.
*B60K 15/03*    (2006.01)
*B60K 15/01*    (2006.01)

(52) U.S. Cl.
CPC ...... *B60K 15/03006* (2013.01); *B60K 15/013* (2013.01); *B60K 2015/0321* (2013.01); *B60K 2015/03144* (2013.01); *B60K 2015/03296* (2013.01); *B60K 2015/03315* (2013.01); *B60K 2015/03473* (2013.01); *F17C 2205/0142* (2013.01)

(58) Field of Classification Search
CPC ...... F17C 2205/0142; B60K 15/03006; B60K 15/013; B60K 2015/03144; B60K 2015/0321; B60K 2015/03296; B60K 2015/03315; F17D 1/04; H01M 8/04104; H01M 8/04201
See application file for complete search history.

(56) References Cited

U.S. PATENT DOCUMENTS

| | | | |
|---|---|---|---|
| 9,017,885 B2* | 4/2015 | Kanie | H01M 8/04201 429/400 |
| 2006/0118175 A1* | 6/2006 | Mathison | F17C 5/04 137/256 |
| 2009/0064764 A1* | 3/2009 | Kizaki | B60L 58/18 73/40.5 R |

(Continued)

FOREIGN PATENT DOCUMENTS

JP    2013228059 A    11/2013

*Primary Examiner* — Atif H Chaudry
(74) *Attorney, Agent, or Firm* — Dickinson Wright, PLLC

(57) ABSTRACT

A gas supply system includes: high-pressure tanks having at least different longitudinal lengths; supply pipes each connected to corresponding one of the high-pressure tanks; a supply-side manifold to which the supply pipes are connected; solenoid valves disposed in the respective supply pipes; a first pressure sensor configured to acquire a pressure related to an internal pressure of the high-pressure tanks; a second pressure sensor configured to acquire a pressure at the supply-side manifold; and a control device that controls the solenoid valve corresponding to the high-pressure tank, among the high-pressure tanks, having the largest ratio of the longitudinal length to a short-side width, to open first when a value obtained by subtracting the pressure detected by the second pressure sensor from the pressure detected by the first pressure sensor is larger than a threshold at the time of activation of the gas supply system.

4 Claims, 4 Drawing Sheets

(56) References Cited

U.S. PATENT DOCUMENTS

| | | | |
|---|---|---|---|
| 2015/0362383 A1 | 12/2015 | Komiya et al. | |
| 2016/0133966 A1* | 5/2016 | Komiya | H01M 8/04223 429/429 |
| 2018/0309146 A1* | 10/2018 | Yoshida | H01M 8/04302 |

* cited by examiner

GAS SUPPLY SYSTEM AND CONTROL METHOD OF GAS SUPPLY SYSTEM

INCORPORATION BY REFERENCE

The disclosure of Japanese Patent Application No. 2019-174984 filed on Sep. 26, 2019 including the specification, drawings and abstract is incorporated herein by reference in its entirety.

BACKGROUND

1. Technical Field

The present disclosure relates to a gas supply system and a control method of the gas supply system.

2. Description of Related Art

There is known a gas supply system that supplies a fuel gas charged in a plurality of high-pressure tanks to one gas supply destination through a supply flow path that is branched and connected to each high-pressure tank (for example, refer to Japanese Unexamined Patent Application Publication No. 2013-228059 (JP 2013-228059 A)).

SUMMARY

When the supply of gas from the high-pressure tank is started, a disadvantage in which vibrations and noise occur and are transmitted to the outside of the system may occur.

The present disclosure can be realized in the aspects below.

(1) A first aspect of the present disclosure relates to a gas supply system, including: a plurality of high-pressure tanks charged with a high-pressure gas, the high-pressure tanks having at least different longitudinal lengths; a plurality of supply pipes each having first end connected to corresponding one of the high-pressure tanks and a second end; a supply-side manifold to which the second end of each of the supply pipes is connected; a plurality of solenoid valves disposed in the respective supply pipes; a first pressure sensor configured to acquire a first pressure related to an internal pressure of the high-pressure tanks; a second pressure sensor configured to acquire a second pressure at the supply-side manifold; and a control device configured to control the solenoid valve corresponding to the high-pressure tank having, among the plurality of high-pressure tanks, the largest ratio of the longitudinal length to a short-side width, to open first and then control the solenoid valve corresponding to the remaining high-pressure tank to open when a value obtained by subtracting the second pressure detected by the second pressure sensor from the first pressure detected by the first pressure sensor is larger than a predetermined threshold at a time of activation of the gas supply system. According to the gas supply system of the first aspect, in a state in which the inner pressure of the high-pressure tanks is larger than the pressure of the supply pipes and therefore vibrations and noise are more likely to be generated from the solenoid valves, the solenoid valve corresponding to the high-pressure tank that has a large ratio of the longitudinal length to the short-side width and thus is unlikely to amplify vibrations and noise is controlled to open first. With this configuration, it is possible to suppress a disadvantage in which the vibrations and noise that may be generated from the solenoid valves when the gas is supplied are transmitted from the high-pressure tanks to the outside.

(2) The control device may be configured to control the solenoid valves to open simultaneously when the value obtained by subtracting the second pressure detected by the second pressure sensor from the first pressure detected by the first pressure sensor is equal to or smaller than the predetermined threshold. According to the gas supply system of this aspect, the control device can determine the state in which there is no effect on generation of vibrations and noise based on the detection results of the first and second pressure sensors, and control the solenoid valves corresponding to the high-pressure tanks to open within a short period of time.

(3) The gas supply system of this aspect may further include: a plurality of charging pipes each having a first end connected to corresponding one of the high-pressure tanks and a second end; and a charging-side manifold to which the second end of each of the charging pipes is connected. The first pressure sensor may be provided in the charging-side manifold. According to the gas supply system of this aspect, the internal pressure of the high-pressure tanks can be acquired with a simple configuration using a single pressure sensor provided in the charging-side manifold to which the supply pipes are connected.

(4) According to a second aspect of the present disclosure relates to a control method of a gas supply system. The control method includes: controlling, when a value obtained by subtracting, from a first pressure of a plurality of high-pressure tanks which have at least different longitudinal lengths and to which first ends of a plurality of supply pipes are respectively connected, a second pressure in a supply-side manifold to which second ends of the plurality of supply pipes are connected is larger than a predetermined threshold at a time of activating the gas supply system, a solenoid valve corresponding to the high-pressure tank having the largest ratio of the longitudinal length to a short-side width among the plurality of high-pressure tanks to open first and then controlling a solenoid valve corresponding to the remaining high-pressure tank to open. The present disclosure can be realized in various modes other than the gas supply system and the control method of the gas supply system. For example, the present disclosure can be realized in the modes such as a fuel cell system equipped with the gas supply system, a vehicle equipped with the gas supply system, control methods of the fuel cell system and the vehicle, a computer program that realizes the control methods, and a non-transitory recording medium that stores the computer program.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

Figure 1:
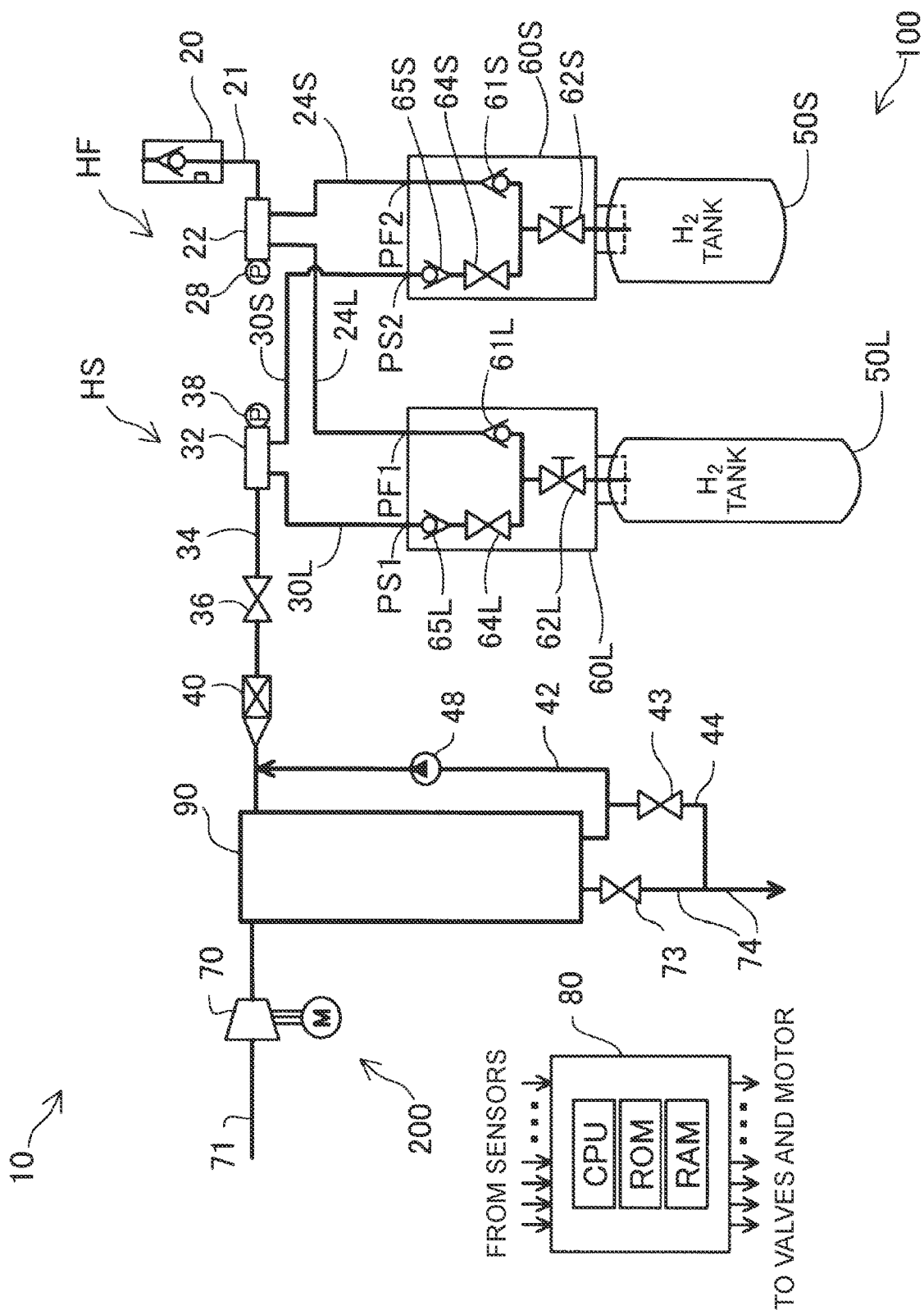
FIG. 1 is an explanatory diagram schematically showing a fuel cell system.

FIG. 1 is an explanatory diagram schematically showing a fuel cell system 10 including a gas supply system 100 according to a first embodiment. The fuel cell system 10 is mounted on, for example, a fuel cell vehicle that uses the fuel cell as a drive source. The fuel cell system 10 includes a gas supply system 100, a fuel cell 90, and an air supply system 200.

The air supply system 200 includes a compressor 70, an air supply pipe 71, an air discharge pipe 74, and a discharge flow rate adjustment valve 73. The air supply pipe 71 is connected to a cathode supply port of the fuel cell 90. The air discharge pipe 74 communicates a cathode discharge port with the atmosphere. The compressor 70 driven by a motor is provided for the air supply pipe 71, and the discharge flow rate adjustment valve 73 is provided in the air discharge pipe 74. In the air supply system 200, a flow rate of the air supplied to a cathode of the fuel cell 90 is controlled by the compressor 70 and the discharge flow rate adjustment valve 73. Unconsumed air (also called cathode off-gas) discharged from the cathode discharge port is discharged from the air discharge pipe 74 to the atmosphere.

The gas supply system 100 supplies to the fuel cell 90 a fuel gas charged in a plurality of high-pressure tanks at high pressure (for example, a hydrogen gas). The gas supply system 100 includes the plurality of high-pressure tanks, a control device 80, a hydrogen charging system HF, and a hydrogen supply system HS. The hydrogen charging system HF charges a hydrogen gas from a hydrogen supply source such as a hydrogen station. The hydrogen supply system HS supplies a hydrogen gas from the high-pressure tanks to the fuel cell 90 that is a gas supply destination.

The fuel cell 90 is configured of a plurality of fuel cells stacked on each other. Each fuel cell includes a membrane electrode assembly (MEA) in which an anode electrode and a cathode electrode are bonded to respective sides of an electrolyte membrane. The fuel cell 90 generates electric power through an electrochemical reaction between a hydrogen gas as a fuel gas and oxygen gas as an oxidizing gas, and drives loads such as a drive motor using the generated electric power.

In the first embodiment, the gas supply system 100 includes two high-pressure tanks, that is, a first high-pressure tank 50L and a second high-pressure tank 50S. In the gas supply system 100, the number of the high-pressure tanks is not limited to two. The gas supply system 100 may include three or more high-pressure tanks.

The high-pressure tanks 50L, 50S are connected to the hydrogen charging system HF and the hydrogen supply system HS via valve units 60L, 60S. The valve unit 60L is attached to the first high-pressure tank 50L, and the valve unit 60S is attached to the second high-pressure tank 50S. The valve units 60L, 60S are each a structure body including a plurality of flow paths and a plurality of valves therein. The valve units 60L, 60S switch between opening and closing of the valves to switch between charging of the hydrogen gas from the hydrogen charging system HF to the high-pressure tanks 50L, 50S and supplying of the hydrogen gas from each of the high-pressure tanks 50L, 50S to the hydrogen supply system HS.

The hydrogen charging system HF includes a receptacle 20, a first charging pipe 21, a charging-side manifold 22, and second charging pipes 24L, 24S. One end of the first charging pipe 21 is connected to the receptacle 20. One end of the second charging pipe 24L is connected to a charging-side port PF1 of the valve unit 60L. One end of the second charging pipe 24S is connected to a charging-side port PF2 of the valve unit 60S.

The charging-side manifold 22 is a pipe path to branch one flow path into a plurality of flow paths. The other end of the first charging pipe 21 and the other ends of the second charging pipes 24L, 24S are connected to the charging-side manifold 22 to supply the hydrogen gas supplied from the first charging pipe 21 to each of the second charging pipes 24L, 24S. The charging-side manifold 22 is provided with a first pressure sensor 28. The first pressure sensor 28 detects a first pressure relating to an internal pressure of the high-pressure tanks 50L, 50S. The term "first pressure relating to an internal pressure of the high-pressure tanks" denotes a pressure for acquiring the internal pressure of the high-pressure tanks 50L, 50S directly or indirectly. In the first embodiment, the pressure in the charging-side manifold 22 connecting to the high-pressure tanks 50L, 50S, the pressure in the second charging pipes 24L, 24S, and the internal pressure in the high-pressure tanks 50L, 50S are equal to each other. Therefore, the first pressure sensor 28 indirectly acquires the internal pressure of the high-pressure tanks 50L, 50S by acquiring the pressure in the charging-side manifold 22. The receptacle 20 is connected to a gas supply source such as a hydrogen station (not illustrated), for example. The hydrogen gas supplied via the receptacle 20 flows to the charging-side manifold 22 through the first charging pipe 21 and is guided to the high-pressure tanks 50L, 50S via the second charging pipes 24L, 24S, respectively.

The hydrogen supply system HS includes a supply-side manifold 32, a first supply pipe 34, second supply pipes 30L, 30S, a circulation pipe 42, and a discharge pipe 44. One end of the first supply pipe 34 is connected to a hydrogen supply port of the fuel cell 90. One end of the second supply pipe 30L is connected to a supply-side port PS1 of the valve unit 60L. One end of the second supply pipe 30S is connected to a supply-side port PS2 of the valve unit 60S.

The supply-side manifold 32 is a pipe path to consolidate the plurality of flow paths into one flow path. The other end of the first supply pipe 34 and the other ends of the second supply pipes 30L, 30S are connected to the supply-side manifold 32 to supply the hydrogen gas supplied from each of the second supply pipes 30L, 30S to the first supply pipe 34. The supply-side manifold 32 is provided with a second pressure sensor 38. The second pressure sensor 38 detects the pressure of the hydrogen supply system HS. More specifically, the second pressure sensor 38 detects the internal pressure of the second supply pipes 30L, 30S and the internal pressure of the first supply pipe 34, which are equilibrium to each other.

The first supply pipe 34 includes a pressure reducing valve 36 and an injector 40 in this order from the supply-side manifold 32 side. The pressure reducing valve 36 is driven under a control of the control device 80, depressurizes the hydrogen gas, and supplies the depressurized hydrogen gas to the injector 40. The injector 40 is driven under the control of the control device 80, and injects the hydrogen gas into the fuel cell 90 to supply the hydrogen gas to the fuel cell 90.

One end of the circulation pipe 42 is connected to a discharge port of the fuel cell 90. The other end of the circulation pipe 42 is connected to the first supply pipe 34 at a position on the fuel cell 90 side of the injector 40. The circulation pipe 42 is provided with a circulation pump 48. The circulation pump 48 is driven under the control of the control device 80 and circulates, to the fuel cell 90, unconsumed hydrogen gas contained in the exhaust gas discharged from the fuel cell 90.

The discharge pipe 44 is connected to the circulation pipe 42 at a position closer to the discharge port of the fuel cell 90 than the position of the circulation pump 48. One end of the discharge pipe 44 is connected to the air discharge pipe 74 of the air supply system 200. The other end of the discharge pipe 44 is connected to the circulation pipe 42. The discharge pipe 44 includes a discharge valve 43. The discharge valve 43 is driven under the control of the control device 80, and discharges the exhaust gas discharged from the fuel cell 90 to the atmosphere via the discharge pipe 44 and the air discharge pipe 74.

Next, the valve units 60L, 60S connected to the high-pressure tanks 50L, 50S will be described. The valve unit 60L of the first high-pressure tank 50L includes a charging-side check valve 61L, a main stop valve 62L, a solenoid valve 64L, and a supply-side check valve 65L. The valve unit 60S of the second high-pressure tank 50S includes a charging-side check valve 61S, a main stop valve 62S, a solenoid valve 64S, and a supply-side check valve 65S.

The main stop valve 62L is a manual valve that switches between opening and closing of communication between the first high-pressure tank 50L, and the second charging pipe 24L and the second supply pipe 30L. The main stop valve 62S is a manual valve that switches between opening and closing of communication between the second high-pressure tank 50S, and the second charging pipe 24S and the second supply pipe 30S. Each of the main stop valves 62L, 62S is opened by being manually operated before the gas supply system 100 is mounted on a vehicle. The charging-side check valves 61L, 61S regulate the flow of the hydrogen gas in the second charging pipes 24L, 24S only in one direction from the charging-side manifold 22 side toward the high-pressure tanks 50L, 50S. The solenoid valves 64L, 64S are controlled by the control device 80 such that the solenoid valves 64L, 64S are driven to open and close. The solenoid valve 64L is a solenoid valve corresponding to the first high-pressure tank 50L. The "solenoid valve 64L is a solenoid valve corresponding to the first high-pressure tank 50L" denotes a solenoid valve that switches between opening and closing of communication between the first high-pressure tank 50L and the second supply pipe 30L connected to the first high-pressure tank 50L. The solenoid valve 64S is a solenoid valve corresponding to the second high-pressure tank 50S, and switches between opening and closing of communication between the second high-pressure tank 50S and the second supply pipe 30S. The supply-side check valves 65L, 65S regulate the flow of the hydrogen gas in the second supply pipes 30L, 30S only in one direction from each of the high-pressure tanks 50L, 50S to the supply-side manifold 32.

The control device 80 is configured of a microcomputer including a microprocessor that executes a logical operation and a memory such as read-only memory (ROM) or a random access memory (RAM). The microprocessor executes a program stored in the memory such that the control device 80 executes various controls for the fuel cell 90, including the control to open and close the valves, such as the injector 40, the pressure reducing valve 36, and the solenoid valves 64L, 64S. In the gas supply system 100 according to the first embodiment, as described later, the control device 80 executes a gas supply control using the detection results of the first pressure sensor 28 and the second pressure sensor 38.

Figure 2:
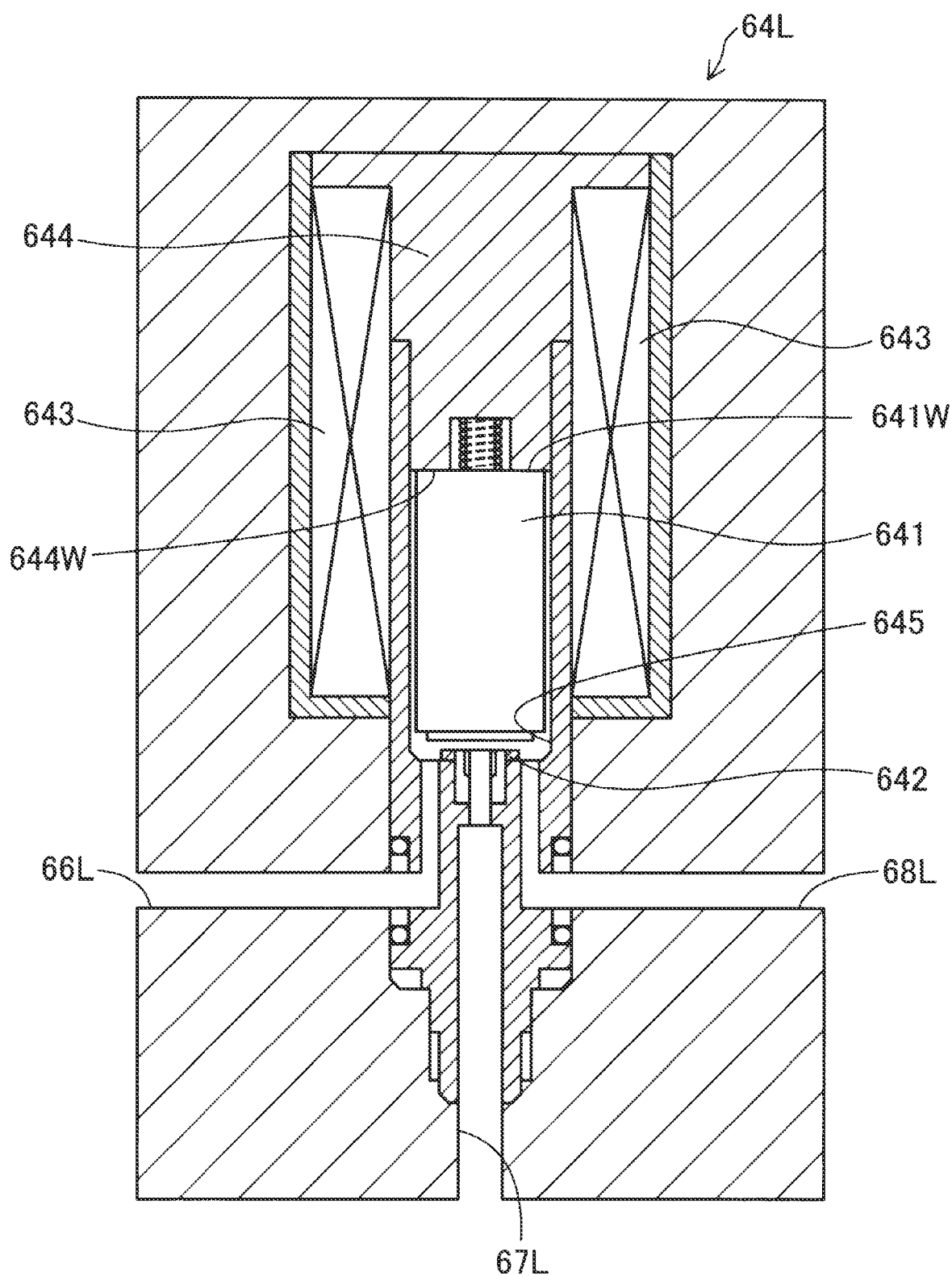
FIG. 2 is a sectional view illustrating a solenoid valve that is in an open state.

With reference to FIG. 2, details of the solenoid valve 64L will be described. FIG. 2 is a sectional view illustrating the solenoid valve 64L that is in an open state. The solenoid valve 64L includes a valve body 641, a valve seat 642, a coil 643, a stopper 644, and a communication space 645 that houses the valve body 641. Note that the configuration of the solenoid valve 64S is the same as that of the solenoid valve 64L, and a description thereof will be omitted.

Flow paths 66L to 68L are provided in the solenoid valve 64L. The flow path 66L functions as a part of the second supply pipe 30L, and is a flow path for communicating the first high-pressure tank 50L with the communication space 645. The flow path 67L functions as a part of the second supply pipe 30L, and communicates with the communication space 645. The flow path 68L is a flow path for communicating the communication space 645 with the outside of the solenoid valve 64L. The flow path 68L is closed by a pressure adjusting valve (not illustrated).

The valve body 641 configured of a magnetic body slides inside the communication space 645 in accordance with excitation and demagnetization of the coil 643 such that the solenoid valve 64L can be switched between an open valve state and a closed valve state. The solenoid valve 64L is closed when a distal end of the valve body 641 is seated on the valve seat 642, and is opened when the distal end of valve body 641 is separated from the valve seat 642. With this configuration, a flow path for communicating the flow path 66L and the flow path 67L is opened and closed.

A stopper 644 functions as a part of a wall surface of the communication space 645. A sliding range of the valve body 641 is restricted in a manner such that a wall surface 644W of the stopper 644 comes into contact with an end surface 641W of the valve body 641 that is open. When the solenoid valve 64L is opened in a state in which the internal pressure of the first high-pressure tank 50L is larger than the pressure of the second supply pipe 30L, an end face 641W of the valve body 641 collides with the wall surface 644W of the stopper 644, which may result in generation of vibrations and noise.

Figure 3:
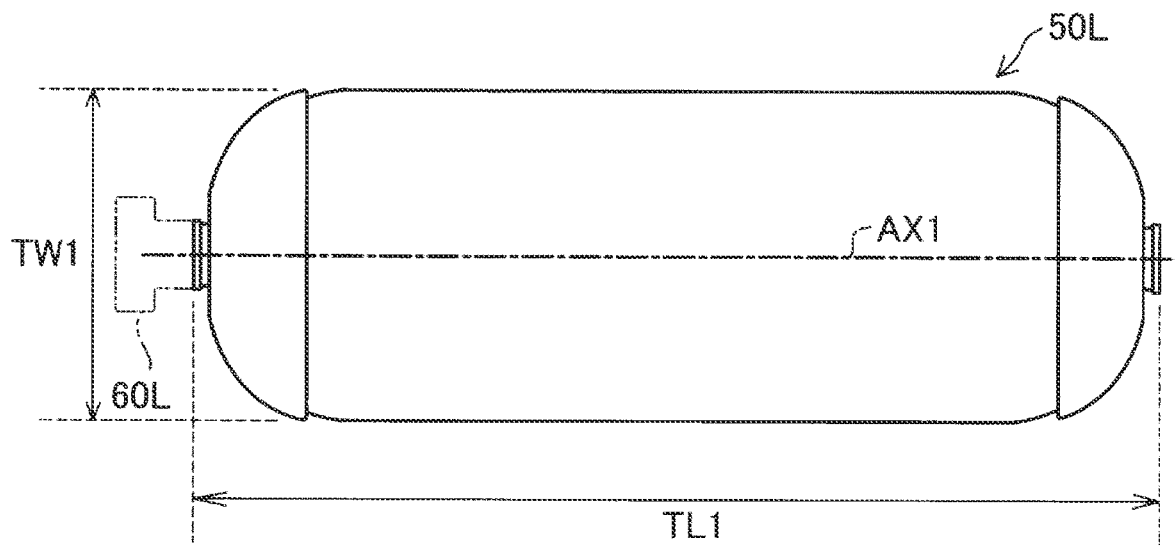
FIG. 3 is an explanatory diagram schematically showing the configuration of a first high-pressure tank.
Figure 4:
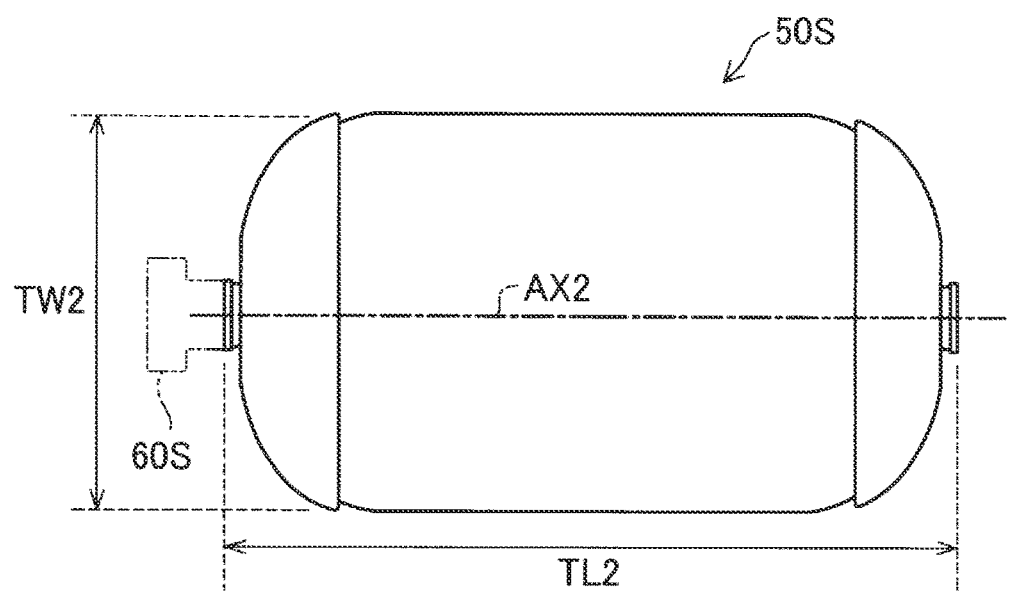
FIG. 4 is an explanatory diagram schematically showing the configuration of a second high-pressure tank.

With reference to FIGS. 3 and 4, details of the first high-pressure tank 50L and the second high-pressure tank 50S will be described. FIG. 3 is an explanatory diagram schematically showing the configuration of the first high-pressure tank 50L. In FIG. 3, a central axis AX1 of the first high-pressure tank 50L is indicated by a dashed line.

The first high-pressure tank 50L has an elongated shape along the central axis AX1. FIG. 3 schematically shows a longitudinal length TL1 of the first high-pressure tank 50L along the central axis AX1, and a short-side width TW1 of the first high-pressure tank 50L. The short-side width of the high-pressure tank denotes a diameter when a sectional shape of the high-pressure tank in a short-side direction is circular, and denotes the maximum width of the sectional shape when the sectional shape is any other shape than a circle. In the first embodiment, the short-side width TW1 of the first high-pressure tank 50L is the same as a diameter of the sectional shape of the first high-pressure tank 50L that is circular, that is, a tank diameter.

FIG. 4 is an explanatory diagram schematically showing the configuration of the second high-pressure tank 50S. The second high-pressure tank 50S has a shape different from that of the first high-pressure tank 50L. Other configurations of the second high-pressure tank 50S are the same as those of the first high-pressure tank 50L.

FIG. 4 shows a longitudinal length TL2 along a central axis AX2 of the second high-pressure tank 50S, and a short-side width TW2 of the second high-pressure tank 50S.

The longitudinal length TL2 is smaller than the longitudinal length TL1 of the first high-pressure tank 50L. The short-side width TW2 is a tank diameter of the second high-pressure tank 50S, and larger than the short-side width TW1 of the first high-pressure tank 50L.

Vibrations and noise transmitted to the high-pressure tank are more likely to be amplified when the ratio of the longitudinal length of the high-pressure tank to the short-side width is close to 1 and the shape of the high-pressure tank becomes closer to a sphere. The high-pressure tank in this case is more likely to transmit vibrations and noise to the outside. When the ratio of the longitudinal length to the short-side width is constant, vibrations and noise are more likely to be amplified as the longitudinal length of the high-pressure tank becomes smaller. In the first high-pressure tank 50L, a ratio K1 is a ratio of the longitudinal length TL1 to the short-side width TW1. In the second high-pressure tank 50S, a ratio K2 is a ratio of the longitudinal length TL2 to the short-side width TW2. In the gas supply system 100 according to the first embodiment, the ratio K1 and the ratio K2 are both larger than 1, and the ratio K1 is larger than the ratio K2. That is, in the first embodiment, the second high-pressure tank 50S is more likely to transmit vibrations and noise to the outside compared to the first high-pressure tank 50L.

Figure 5:
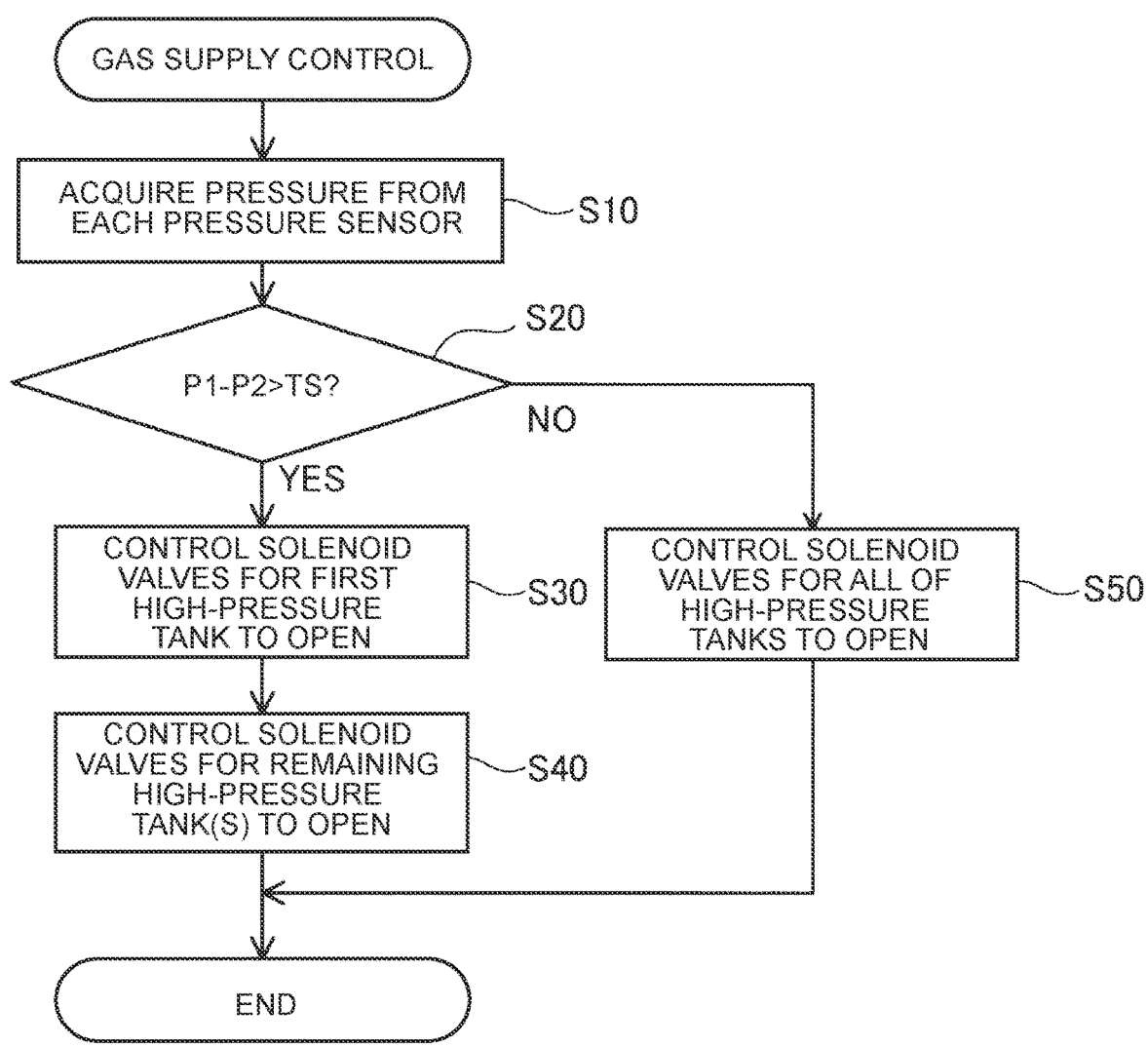
FIG. 5 is a flowchart showing a gas supply control executed by a control device.

With reference to FIG. 5, the gas supply control executed by the control device 80 of the gas supply system 100 in the first embodiment will be described. FIG. 5 is a flowchart showing the gas supply control executed by the control device 80. The gas supply control shown in FIG. 5 is started, for example, when the gas supply system 100 is activated when a start switch in a vehicle equipped with the gas supply system 100 is turned on. At the time when the gas supply system 100 is activated, the pressure reducing valve 36 and the solenoid valves 64L, 64S are closed, and the main stop valves 62L, 62S are open.

When the gas supply system 100 is activated, the control device 80 acquires the detection results of the first pressure sensor 28 and the second pressure sensor 38 (step S10). A pressure P1 detected by the first pressure sensor 28 denotes the internal pressure of the high-pressure tanks 50L, 50S as described above. A pressure P2 detected by the second pressure sensor 38 denotes the internal pressure of the second supply pipes 30L, 30S and the first supply pipe 34 from the solenoid valves 64L, 64S to the pressure reducing valve 36.

When the control device 80 acquires the pressure P1 and the pressure P2, the control device 80 performs calculation by subtracting the pressure P2 from the pressure P1, compares the calculation result with a predetermined threshold TS, and determines whether the calculation result is larger than the threshold TS (step S20). The threshold TS is preferably 5 MPa or more, for example. With this configuration, it is possible to reduce an effect by an error caused by a detection accuracy of each of the first and second pressure sensors 28, 38. The threshold TS is more preferably 10 MPa or more. Accordingly, it is possible to exclude a region where vibrations and noise generated from the solenoid valves 64L, 64S are small, and thus to avoid an unnecessary limitation on the order of opening the solenoid valves 64L, 64S.

When the control device 80 determines that the calculation result is equal to or smaller than the threshold TS (S20: NO), the control device 80 controls the solenoid valves 64L, 64S corresponding to the high-pressure tanks 50L, 50S to open simultaneously (step S50). "Control the solenoid valves to open simultaneously" denotes that the solenoid valves are controlled to open within 0.1 sec. The timing to control the solenoid valves 64L, 64S to open is not limited to simultaneous timing. The solenoid valves 64L, 64S may be opened in any appropriate order. The control device 80 ends the routine when the solenoid valves 64L, 64S are opened.

When the control device 80 determines that the calculation result is larger than the threshold TS (S20: YES), the solenoid valve corresponding to the high-pressure tank having the largest ratio of the longitudinal length to the short-side width, among the plurality of high-pressure tanks, is first opened (step S30). In the gas supply system 100 according to the first embodiment, the ratio K1 of the first high-pressure tank 50L is larger than the ratio K2 of the second high-pressure tank 50S. Therefore, the control device 80 controls the solenoid valve 64L corresponding to the first high-pressure tank 50L to open first. For example, when the short-side widths of the high-pressure tanks are the same, for example, when the tank diameters of the high-pressure tanks are substantially the same, in step S30, the control device 80 may determine the order of opening the solenoid valves using the longitudinal length of each high-pressure tank, and may control the solenoid valve corresponding to a high-pressure tank having the longest longitudinal length among the high-pressure tanks to open first. When the ratio of the longitudinal length to the short-side width is all the same but the longitudinal length differs for the high-pressure tanks, for example, the control device 80 may control the solenoid valve corresponding to the high-pressure tank having the longest longitudinal length to open first.

After the solenoid valve 64 corresponding to the first high-pressure tank 50L is opened, the control device 80 controls the solenoid valve 64S corresponding to the second high-pressure tank 50S to open (step S40). That is, the solenoid valve 64S is opened after the gas is supplied from the first high-pressure tank 50L and a pressure difference between the high-pressure tanks 50L, 50S and the second supply pipes 30L, 30S is reduced. When the gas supply system 100 includes three or more high-pressure tanks, the control device 80 may control the solenoid valve corresponding to a high-pressure tank having the largest ratio of the longitudinal length to the short-side width to open first, and then control all the solenoid valves corresponding to the remaining high-pressure tanks to open simultaneously or in any appropriate order. The "remaining high-pressure tanks" denotes the high-pressure tanks that are other than the high-pressure tank for which the corresponding solenoid valve is first opened in step S30, and have the corresponding solenoid valves that are planned to be open. For example, in a form in which the gas supply system 100 is configured to, every time the gas in one high-pressure tank is completely consumed, change over to, one by one, another high-pressure tank having solenoid valve to be opened in step S40, the high-pressure tank for which its corresponding solenoid valve is not planned to be opened is not included in the "remaining high-pressure tanks". The control device 80 ends the routine after the solenoid valves 64L, 64S are opened.

As described above, according to the gas supply system 100 of the first embodiment, the control device 80 controls the solenoid valve 64L corresponding to the first high-pressure tank 50L having the largest ratio of the longitudinal length to the short-side width to open first and then controls the solenoid valve 64S corresponding to the second high-pressure tank 50S to open when a value obtained by subtracting the pressure P2 detected by the second pressure sensor 38 from the pressure P1 detected by the first pressure sensor 28 is larger than the predetermined threshold TS at the time of activating the gas supply system 100. With this configuration, when the gas is supplied, it is possible to suppress a disadvantage in which vibrations and noise that may be generated by the solenoid valves 64L, 64S are amplified by the high-pressure tanks 50L, 50S and then transmitted to the outside.

According to the gas supply system 100 of the first embodiment, the control device 80 controls the solenoid valves 64L, 64S to open simultaneously when the value obtained by subtracting the pressure P2 detected by the second pressure sensor 38 from the pressure P1 detected by the first pressure sensor 28 is equal to or smaller than the threshold TS. With this configuration, the control device 80 can control the solenoid valves 64L, 64S corresponding to the high-pressure tanks 50L, 50S, respectively, to open within a short period of time by determining the state in which there is no effect on generation of vibrations and noise based on the detection results of the first and second pressure sensors 28, 38.

According to the gas supply system 100 of the first embodiment, the first pressure sensor 28 is provided in the charging-side manifold 22 to which the plurality of second charging pipes 24L, 24S are connected. Therefore, the internal pressure of each of the high-pressure tanks 50L, 50S can be acquired with a simple configuration using a single pressure sensor.

B. Other Embodiments (B1) In the first embodiment, an example is described in which the longitudinal length differs between the first high-pressure tank 50L and the second high-pressure tank 50S. When the gas supply system 100 includes three or more high-pressure tanks, all the high-pressure tanks need not have different longitudinal lengths from each other. For example, one of the high-pressure tanks may have the longest longitudinal length, and the remaining high-pressure tanks may have the longitudinal lengths that are identical to each other. In this case, the control device 80 may execute the gas supply control such that the solenoid valve corresponding to the high-pressure tank having the largest ratio of the longitudinal length to the short-side width opens first when the pressure P1 detected by the first pressure sensor 28 is larger than the pressure P2 detected by the second pressure sensor 38.

(B2) In the first embodiment, after the control device 80 acquires the pressure P1 and the pressure P2, the control device 80 performs calculation by subtracting the pressure P2 from the pressure P1, compares the calculation result with the predetermined threshold TS, and determines whether the calculation result is larger than the threshold TS in step S20. On the contrary, the control device 80 may determine whether the pressure P1 is larger than the pressure P2 by comparing the pressure P1 and the pressure P2 without providing the threshold TS. The determination as to whether the pressure P1 is larger than the pressure P2 may be realized by setting the threshold TS near zero.

(B3) In the first embodiment, the first pressure sensor 28 is provided in the charging-side manifold 22. However, the internal pressure of the high-pressure tanks may be detected indirectly by providing the first pressure sensor 28 in any of the pipe paths of the hydrogen charging system HF, such as the second charging pipes 24L, 24S, and acquiring a first pressure value relating to the internal pressure of the high-pressure tanks in the gas supply system 100.

(B4) In the first embodiment, the solenoid valves 64L, 64S are controlled to open simultaneously when the value obtained by subtracting the pressure P2 detected by the second pressure sensor 38 from the pressure P1 detected by the first pressure sensor 28 is equal to or smaller than the predetermined threshold TS. However, the solenoid valves 64L, 64S may be opened in any appropriate order. When the gas supply system includes three or more high-pressure tanks, the solenoid valves corresponding to the respective high-pressure tanks may be controlled to open in an appropriate order.

(B5) In the first embodiment, the solenoid valves 64L, 64S are provided in the respective valve units 60L, 60S. However, the solenoid valves 64L, 64S may be provided for the second supply pipes 30L, 30S, respectively, instead of being provided in the valve units 60L, 60S.

The present disclosure is not limited to the above-described embodiments, and can be implemented with various configurations without departing from the scope thereof. For example, the embodiments corresponding to technical features in the aspect described in the Summary, technical features in other embodiments may be appropriately replaced or combined in order to solve some or all of the above-described issues, or in order to achieve some or all of the effects described above. In addition, unless described as essential in the present specification, the technical features may be deleted as appropriate.

What is claimed is:

1. A gas supply system, comprising:
   a plurality of high-pressure tanks charged with a high-pressure gas, the high-pressure tanks having at least different longitudinal lengths;
   a plurality of supply pipes each having a first end connected to corresponding one of the high-pressure tanks and a second end;
   a supply-side manifold to which the second end of each of the supply pipes is connected;
   a plurality of solenoid valves disposed in the respective supply pipes;
   a first pressure sensor configured to acquire a first pressure related to an internal pressure of the high-pressure tanks;
   a second pressure sensor configured to acquire a second pressure at the supply-side manifold; and
   a control device configured to control the solenoid valve corresponding to the high-pressure tank having, among the plurality of high-pressure tanks, a largest ratio of the longitudinal length to a short-side width, to open first and then control the solenoid valve corresponding to the remaining high-pressure tank to open when a value obtained by subtracting the second pressure detected by the second pressure sensor from the first pressure detected by the first pressure sensor is larger than a predetermined threshold at a time of activation of the gas supply system.

2. The gas supply system according to claim 1, wherein the control device is configured to control the solenoid valves to open simultaneously when the value obtained by subtracting the second pressure detected by the second pressure sensor from the first pressure detected by the first pressure sensor is equal to or smaller than the predetermined threshold.

3. The gas supply system according to claim 1, further comprising:
   a plurality of charging pipes each having a first end connected to corresponding one of the high-pressure tanks and a second end; and
   a charging-side manifold to which the second end of each of the charging pipes is connected, wherein the first pressure sensor is provided in the charging-side manifold.

4. A control method of a gas supply system, comprising: controlling, when a value obtained by subtracting, from a first pressure of a plurality of high-pressure tanks which have at least different longitudinal lengths and to which first ends of a plurality of supply pipes are respectively connected, a second pressure in a supply-side manifold to which second ends of the plurality of supply pipes are connected is larger than a predetermined threshold at a time of activating the gas supply system, a solenoid valve corresponding to the high-pressure tank having a largest ratio of the longitudinal length to a short-side width among the plurality of high-pressure tanks to open first and then controlling a solenoid valve corresponding to the remaining high-pressure tank to open.

* * * * *